Aug. 7, 1928.                                                                    1,679,709
C. G. COOPER
HOSE COUPLER
Filed March 2, 1926                                     2 Sheets-Sheet 2
Fig.4.   Fig.5.
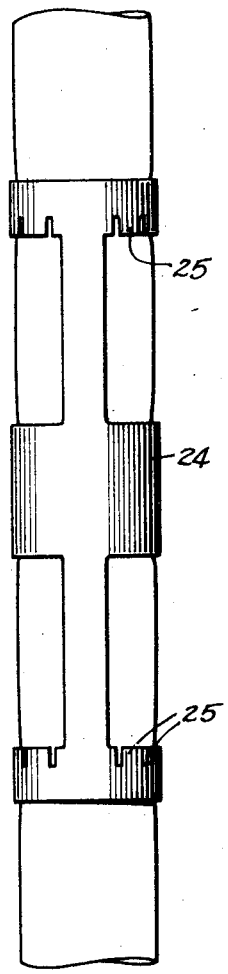
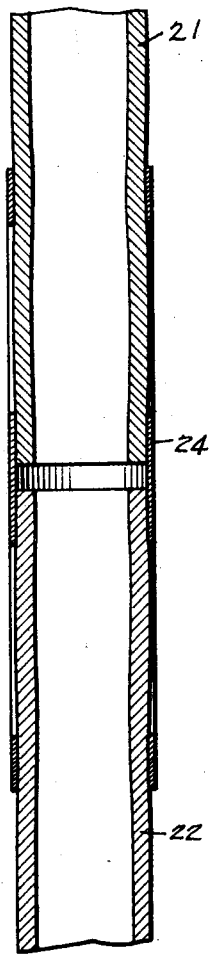
Fig.6.
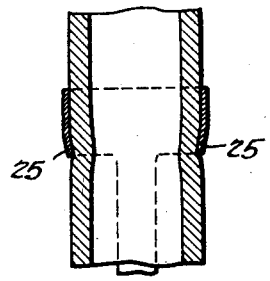
Inventor
CHARLES G. COOPER
By Munn & Co.
Attorney Patented Aug. 7, 1928.

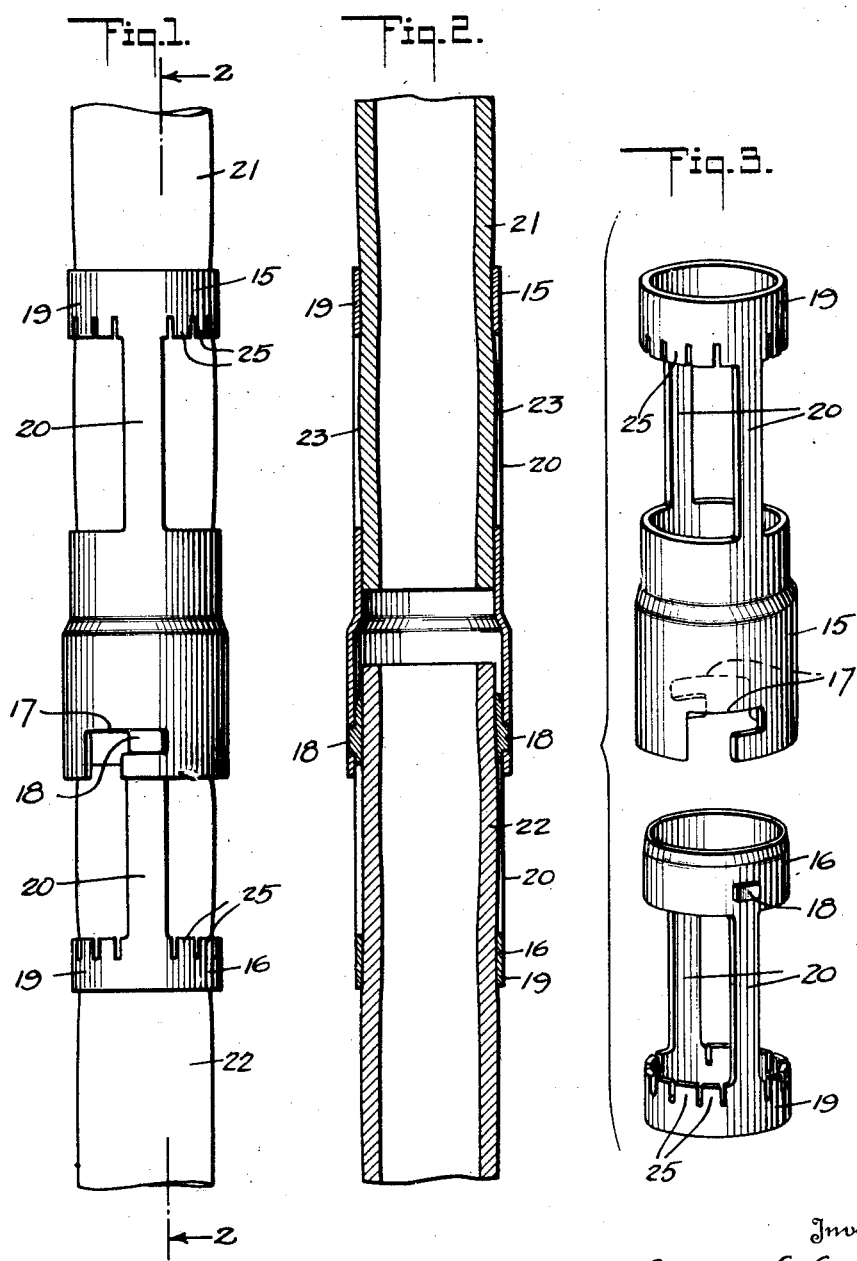

1,679,709

UNITED STATES PATENT OFFICE.

CHARLES GEORGE COOPER, OF YUMA, ARIZONA.

HOSE COUPLER.

Application filed March 2, 1926. Serial No. 91,801.

My invention relates to hose couplings, particularly adapted for the connecting of sections of flexible hose such as garden hose or air hose for pneumatic tools.

It is a purpose of my invention to provide a hose coupler of extremely simple and inexpensive construction which is readily applicable to the meeting ends of a pair of hose sections for securely coupling the sections and in a manner to utilize the radial expansion of the hose under the action of the fluid pressure therein to lock the coupler to hose sections and to hermetically seal the joint between the sections to prevent escape of the fluid at the joint.

It is also a purpose of my invention to provide one form of hose coupler which is designed to permanently connect adjacent sections of hose, and another form which permits the quick detaching of adjacent hose sections, both forms, however, utilizing the expansive action of the hose sections to secure the couplers against displacement and to effectively seal the joints.

I will describe only two forms of hose couplers embodying my invention, and will then point out the novel features thereof in claims.

In the drawings

Figure 1 is a view showing in side elevation one form of hose coupler embodying my invention in applied position to a pair of hose sections;

Figure 2 is a longitudinal sectional view taken on the line 2—2 of Figure 1;

Figure 3 is a view showing in perspective the two sections of the hose coupler shown in the preceding views;

Figure 4 is a view similar to Figure 1, showing another form of hose coupler embodying my invention;

Figure 5 is a longitudinal sectional view of the hose coupler as shown in Figure 4;

Figure 6 is a fragmentary sectional view of either the coupler shown in Figure 1 or that shown in Figure 4, with the tongues thereof bent to grip the hose section.

Similar reference characters refer to similar parts in each of the several views.

Referring specifically to the drawings, and particularly to the form shown in Figures 1 to 3, inclusive, my invention in its present embodiment comprises a tubular body which, in the present instance, is formed of a female section 15 and a male section 16, the female member being provided with bayonet slots 17 in which work pins 18 carried by the male member to lock the male member within the female member and thereby provide a detachable connection between the two.

These members 15 and 16 are extended in opposite directions from their point of connection to provide two locking yokes, and as the construction of the two yokes is identical a description of one will suffice for both. Each yoke comprises an annulus 19 connected to the member 15 or 16 by a pair of arms 20 extending from the annulus at diametrically opposed points and connected to the member 15 or 16 at corresponding points. These yokes, as shown, are formed integral with the members 15 and 16 and may be constructed from a single length of metal pipe cut longitudinally and transversely at diametrically opposed points to form the arms 20 and the annulus 19. In manufacturing it is desirable that the yokes be constructed in this manner, but it is to be understood that they may be constructed separately from the members 15 and 16 and welded or otherwise secured thereto.

In the applied position of the coupler to two sections of hose indicated at 21 and 22, respectively, the meeting ends of the hose sections are forced through the yokes and into the members 15 and 16 to the positions clearly illustrated in Figure 1, it being understood that the internal diameter of the yokes and members is such as to snugly receive the hose sections. By now inserting the pins 18 into the bayonet slots 17 and partly rotating the member 16 to the right as when viewed in Figure 1, the pins 18 will co-operate with the slot 17 to lock the male member within the female member, as clearly illustrated in Figure 2. If any fluid under pressure is now caused to enter the hose sections, the pressure of such fluid will operate to readily expand the extreme meeting ends of the hose sections into firm engagement with the inner wall of the member 15 and thereby hermetically seal the ends against the escape of the fluid from the members 15 and 16. The radial expansion of the hose section is further utilized by virtue of the openings between the arms 20 and the annuli 19 with respect to the members 15 and 16, those portions of the hose sections reposing within these openings being free to expand radially to provide enlargements at these points, as indicated at 23 in Figure 2, which function to lock the yokes on the hose sections against longitudinal displacement and thereby fixedly securing the male and female members of the coupler in proper position at all times.

A hose coupler constructed and operating as described is adaptable to flexible hose sections capable of radial expansion under the action of fluid pressure and where the external diameter of the hose sections is such as to be fitted within the yokes and members of the coupler, and it will be understood that the parts of the hose coupler are readily applicable to the hose sections without in any way modifying the construction of the hose sections.

Referring now to Figures 4 and 5, I have herein shown another form of hose coupler embodying my invention, which is adapted for the permanent connection of two sections of flexible hose capable of radial expansion. This coupler is identical to the coupler shown in Figures 1 to 3, inclusive, with the exception that in place of the detachable male and female members 15 and 16 a tubular body 24 is provided to form an integral connection between the two yokes. Into this tubular body 24 the extreme meeting ends of the hose sections are adapted to be inserted following insertion of the hose sections through the yokes, and with the confronting ends of the hose sections applied as in Figure 5 it will be clear that under the radial expansion of such ends due to internal fluid pressure they will be forced outwardly into fluid-tight engagement with the inner wall of the member 24. Further, those portions of the hose sections disposed within the openings of the yokes are free to expand radially to lock the yokes against displacement from the hose sections.

In both forms of my invention the annuli 19 are split at circumferentially spaced intervals along the inner edge to provide tongues 25 which are bendable inwardly to firmly grip a hose section, as clearly illustrated in Figure 6, to provide further means for securing the yokes in fixed position upon the hose sections and to permit the adaptation of the coupler to hose sections having external diameters considerably less than the internal diameter of the coupler, or, in other words, where the hose section is of such diameter that the radial expansion thereof does not suffice to lock the yokes against longitudinal displacement.

Although I have herein shown and described only two forms of hose coupler embodying my invention, it is to be understood that various changes and modifications may be made therein without departing from the spirit of the invention and the spirit and scope of the appended claims.

I claim:

1. A hose coupler comprising a tubular body adapted to receive the confronting end portions of a pair of hose sections capable of radial expansion under the action of internal fluid pressure, said body having an intermediate tubular portion in which the extreme confronting ends of the hose sections are adapted to be received and expanded radially against the inner wall of the portion under the action of the fluid pressure so as to hermetically seal the joint between the sections, and end portions formed with openings between the intermediate portion and ends of the body into which the hose sections are capable of being expanded under the action of the fluid pressure to thereby lock the body to the sections.

2. A hose coupler comprising a tubular body adapted to receive the confronting end portions of a pair of hose sections capable of radial expansion under the action of internal fluid pressure, said body having an intermediate tubular portion in which the extreme confronting ends of the hose sections are adapted to be received and expanded radially against the inner wall of the portion under the action of the fluid pressure so as to hermetically seal the joint between the sections, end portions formed with openings between the intermediate portion and ends of the body into which the hose sections are capable of being expanded under the action of the fluid pressure to thereby lock the body to the sections, and bendable tongues on the end portions adapted to be bent inwardly to clampingly engage the hose sections.

3. A hose coupler comprising tubular male and female members adapted to receive the extreme confronting ends of a pair of hose sections, and tubular yokes secured to the members through which the hose sections are adapted to be extended, said yokes being provided with openings into which portions of the hose sections are adapted to be expanded radially under the action of internal fluid pressure to thereby lock the sections against longitudinal displacement from the yokes.

4. A hose coupler as embodied in claim 3, wherein each of said yokes comprises an annulus, and spaced arms connected to the annulus and to the corresponding member.

5. A hose coupler as embodied in claim 3, wherein each of said yokes comprises an annulus, spaced arms connected to the annulus and to the corresponding member, and tongues on the annulus bendable inwardly to grip the corresponding hose section.

CHARLES GEORGE COOPER.